Sept. 30, 1930.    L. HOMOLY    1,777,119
GRAB HOOK
Filed July 9, 1928
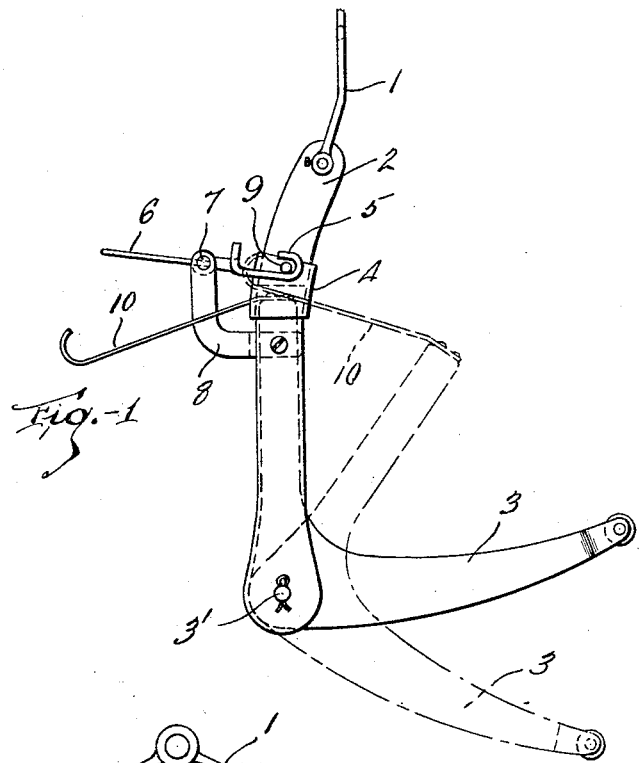
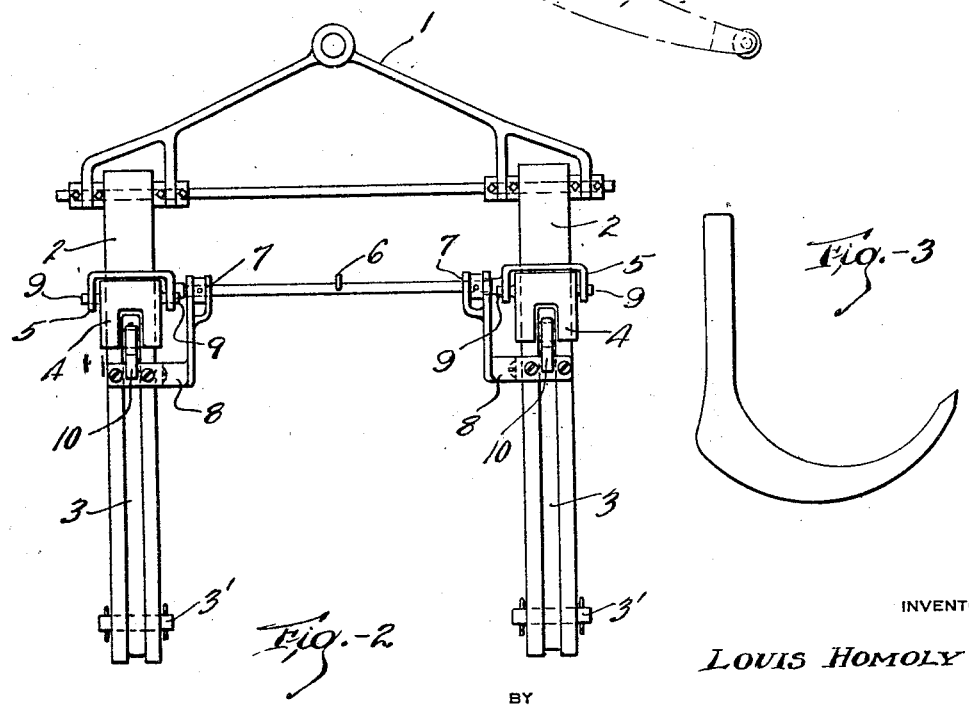
INVENTOR
LOUIS HOMOLY
BY Milburn and Milburn,
ATTORNEYS Patented Sept. 30, 1930

1,777,119

UNITED STATES PATENT OFFICE

LOUIS HOMOLY, OF CLEVELAND, OHIO, ASSIGNOR OF ONE-HALF TO LOUIS HOMOLY, JR., OF CLEVELAND, OHIO

GRAB HOOK

Application filed July 9, 1928. Serial No. 291,415.

This invention relates to an improved form of grab hook for use in connection with steel billets.

The object of the present invention is to devise such a hook with improved mechanism for securing the hook in operative position and for releasing the same.

Other objects will appear from the following description and claims when considered together with the accompanying drawing.

Fig. 1 is a side elevation of my improved structure; Fig. 2 shows the same structure in rear elevation; and Fig. 3 shows a modified form of hook for use in connection with hot billets.

The present hook may be used in connection with steel billets either in hot or cold condition and provision is herein made for the use of especially designed hooks according to whether they are to be used for hot or cold billets.

The entire device is supported by the cable 1 and comprises a pair of depending arms 2, upon each of which is pivotally mounted the angular shaped hook member 3, the point of pivotal connection being indicated at 3'. A collar 4 is in each case adapted to be moved up and down so as to engage over the top end portion of one arm of the angularly shaped, pivotally mounted hook member and thereby maintain the same in raised or operative position. The upright portion of the hook member extends between the spaced arms of the bracket upon which the same is mounted, thereby constituting what might be recognized as a clevis, as indicated in the drawings. The collar 4 may be raised by means of the hook-shaped member 5 which is provided with the handle 6 pivoted at the points 7 upon the bracket 8. This bracket is mounted upon the main arm 2 in each case. The hook-shaped member 5 engages pins 9 on the collar 4 during such raising operation. Upon raising the collar in the manner just now described, the hook is then free to swing by gravity about its pivot so as to occupy lowered or idle position and to thereby deposit a load of billets. The extent of such pivotal movement of the hook members is limited by means of the arms 10 which are fixedly mounted upon the upper ends of the hook members and are adapted to engage a fixed part of the main arm in each case. These parts are so constructed and arranged that the hook member in each case is stopped in its releasing pivotal movement at such a point that upon then merely lowering the grab hook device upon the floor, the pivotally mounted hook members will be returned to their upright operative position, whereupon, they may then be locked in such operative position by lowering the collars 4 so as to engage over the upper ends of the hook members.

In actual use, the laterally extending portions of the hook members are inserted beneath the load of billets which may then be raised and conveyed to the point desired. Then, upon depositing the load, the handle 6 is manipulated so as to raise the collar in each case, thereby permitting the hook members to lower to idle position, upon raising of the entire device. Since the pivotal movement of the hook members is limited, they may be turned back to operative position by merely engaging the same against the ground so as to turn about their pivots. Then they may be locked in such position by lowering the collars, and the device is again ready to be inserted under another load.

It is to be understood that the form of construction herein shown and described is merely for purposes of illustration and that the same may be modified without departing from the spirit of the present invention. The particular design of the hook members themselves, as well as the design of the other elements of construction, may be varied, and all such modifications and variations are intended to be comprehended by the following claims.

From the above disclosure, it will be seen that I have devised a substantial form of hook which is not complicated in its construction or operation and which, at the same time, is altogether capable of performing the intended operation in an efficient manner.

What I claim as new is:

1. A device of the character described comprising a main supporting means, a plurality of arms depending therefrom in spaced relation, a hook of angular form pivotally mounted upon each of said arms, the upper portions of said hooks, when in operative position, lying substantially parallel and in close proximity to the said arms, collar members slidably mounted upon said arms and being adapted to engage and thereby secure said hooks in operative position, and means mounted upon said arms for manipulating said collar members so as to lock or release said hook members.

2. A device of the character described comprising a main supporting means, a plurality of arms depending therefrom in spaced relation, a hook of angular form pivotally mounted upon each of said arms, the upper portions of said hooks, when in operative position, lying substantially parallel and in close proximity to the said arms, collar members slidably mounted upon said arms and being adapted to engage and thereby secure said hooks in operative position, and means for limiting the pivotal movement of said hooks so as to permit the hooks to be returned to operative position upon lowering of the same into engagement with the floor.

3. A device of the character described, comprising a supporting frame, a plurality of spaced bifurcated supports depending from said frame, a load-engaging member having an upwardly extending lever arm pivoted upon each support, a collar slidably mounted on each support for releasably securing said lever arm to the support, and means for controlling the sliding movement of said collar.

4. A device of the character described comprising a supporting frame having a plurality of depending arms, an angular-shaped hook pivotally mounted at its corner upon each arm and having a portion adapted to extend parallel and in close proximity to said arm when in load-supporting position, and means adapted for releasable engagement with said arm and said portion of the hook in each case so as to hold said hooks in load-supporting position.

5. A device of the character described comprising a supporting frame, a bifurcated support depending from said frame, a load-engaging means having an upwardly extending lever arm pivoted in the bifurcated portion of said support and adapted to extend parallel therewith, and a collar slidably mounted upon said support for surrounding engagement with said bifurcated support and said lever arm so as to hold said means in load-supporting position.

In testimony whereof, I hereby affix my signature.

LOUIS HOMOLY.